April 26, 1955    A. H. YARDLEY    2,707,256
MOTOR CONTROL SYSTEM FOR VEHICLE WIND SCREEN WIPERS
Filed March 22, 1950

Inventor
A. H. Yardley

United States Patent Office 2,707,256
Patented Apr. 26, 1955

2,707,256
MOTOR CONTROL SYSTEM FOR VEHICLE WIND SCREEN WIPERS

Alfred Harold Yardley, Selly Oak, Birmingham, England, assignor to Joseph Lucas Limited, Birmingham, England Application March 22, 1950, Serial No. 151,077

Claims priority, application Great Britain April 12, 1949

1 Claim. (Cl. 318—75)

This invention relates to vehicle wind screen wipers of the kind in which each of a pair of oscillatory arms is driven by an electric motor through intermediate mechanism. The object of the invention is to provide simple and effective means for ensuring proper co-ordination of the movements of the two arms.

Figure 1:
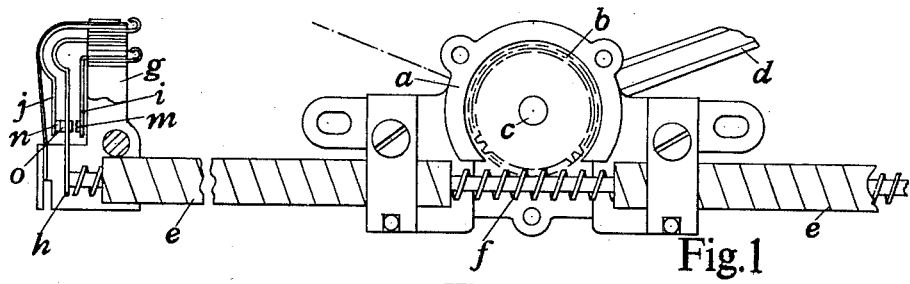
Figure 1 is a part of a rear elevation of a wiper provided with the invention.

Referring to Figure 1, each wiper mechanism comprises a housing $a$ adapted to be mounted on a vehicle adjacent to an edge of the wind screen. In the housing is contained a toothed wheel $b$ carried on a spindle $c$ to the outer end of which is secured the oscillatory wiper arm $d$. The housing $a$ also has secured to it flexible sheaths $e$ which contain and serve as guides for a flexible and reciprocable rack $f$ which adjacent to the wheel $b$ is exposed for engagement with the said wheel as shown. The rack $f$ in this example consists of a wire helically coiled on a flexible core. At one end the rack is connected to any convenient actuating mechanism (not shown) which includes a crank and reduction gearing to which motion is imparted by an electric motor, the crank serving in known manner to impart reciprocatory motion to the rack under the action of the motor. Adjacent to the other end of the rack there is secured to the sheath $e$ a bracket $g$ which carries a two-way switch. This switch comprises a spring blade $h$ which at one end extends across the path of the rack and which at the other end is secured to the bracket. At opposite sides of the blade $h$ are provided two other spring blades $i$, $j$, which are also secured to the bracket, the blades being suitably insulated electrically from each other and adapted at their fixed ends for connection to the motor-controlling circuits. In an earth-return system of wiring the blade $h$ is earthed.

The blades $i$, $j$ are respectively provided with contacts $m$, $n$ which co-operate with opposite sides of a contact $o$ on the blade $h$. The arrangement is such that reciprocation of the rack is accompanied by movements of the blade $h$ between the blades $i$, $j$, for alternately opening and closing the associated circuits.

Figure 2:
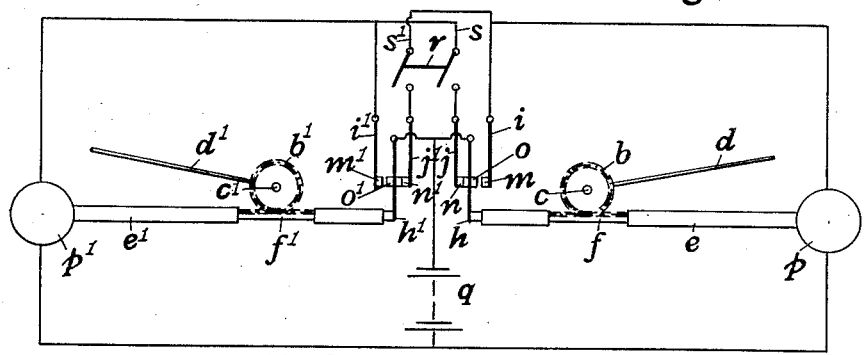
Figures 2, 3 and 4 are diagrams illustrating the electrical interconnections of a wiper provided with the invention.
Figure 3:
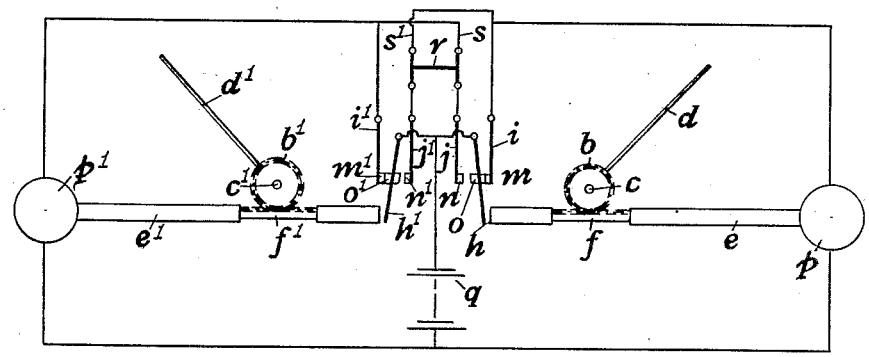
Figure 4:
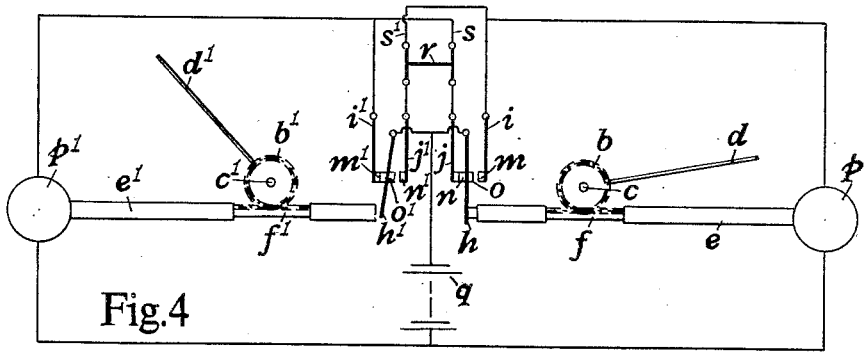

As shown in Figures 2 to 4, two such mechanisms as above described are provided for actuating a pair of wiper arms $d$, $d'$ on the same wind screen, one of these mechanisms being indicated by the reference characters employed in Figure 1 and the other being indicated by the same reference characters suffixed by 1. The two motors $p$, $p'$ are connected in parallel with each other through the switches $h$—$o$, $h'$—$o'$ to a source of current supply, such as a battery $q$, the associated circuits being controlled by a manually-operable switch $r$.

Figures 2–4 illustrate diagrammatically the wiring arrangement. The arrangement is such that each arm $d$ or $d'$ receives its motion during the greater part of each oscillation, from its associated motor $p$ or $p'$, but towards the end of each oscillation the corresponding reciprocatory rack $f$ or $f'$ abuts against the movable switch blade $h$ or $h'$ of the associated switch and causes it to close a branch circuit $s'$ or $s$ of the other motor $p'$ or $p$. Consequently the normal current-supply circuit of each motor is interrupted in each oscillation of the arm, but so long as the arms are moving in unison, the motion of either motor is maintained through the switch of the other motor. Later the rack $f$ or $f'$ leaves the blade $h$ or $h'$ and allows it to return to its initial position. In the event, however, of either motor overrunning the other, its motion will be arrested by the action of its associated switch until it can be resumed by the action of the other switch. The effect of a difference in the speeds of the motors is thus automatically compensated, and the required co-ordination of the movements of the arms is automatically maintained.

Figure 2 shows the condition of the system when at rest with the switch $r$ open. On closing this switch, the left hand motor $p'$ will receive current through the rack-operated switch of the right-hand wiper mechanism, and the right hand motor $p$ will receive current through the corresponding switch of the left-hand mechanism. With consequent actuation of the motors, and movement of the racks, the switch blades $h$ will take up the position shown in Figure 3, and will alternately occupy the positions shown in Figures 2 and 3 so long as the arms are oscillated in synchronism. But in the event of the arms getting out of step due to inequality in the relative speeds of the two motors a condition will be assumed in which one or the other of the motors $p$, $p^1$ will be isolated from the battery. Thus, contacts $n$, $o$ and $m^1$, $o^1$ may be closed as indicated in Figure 4, in which case the right hand motor $p$ will be isolated from the battery $q$. Alternatively, the contacts $m$, $o$ and $n^1$, $o^1$ may be closed, in which case the left hand motor $p^1$ will be isolated from the battery $q$. In either case the isolated motor will thereupon come to rest, until the other motor by its continued action restores the normal relationship between the wiper arms.

The invention is not, however, restricted to the example described, as it may be applied in essentially the same manner to other forms of wiper mechanisms, in which a pair of arms are oscillated by a pair of motors. Also details of the switch construction may be varied to suit different requirements.

Having thus described my invention what I claim as new and desire to secure by Letters Patent is:

A vehicle wind screen wiper comprising in combination a pair of oscillatory arms, a pair of actuating members respectively connected to said arms for imparting oscillatory motion thereto, a pair of electric driving motors respectively connected to said actuating members for imparting motion thereto, a first main electric current-supply circuit connected to one of said motors, a second main electric current-supply circuit connected to the other of said motors, a first branch circuit connected to said first main circuit, a second branch circuit connected to said second main circuit, and a pair of two-way switches respectively operable by said actuating members, one of said two-way switches being connected to said first main circuit and said second branch circuit so that this switch serves in one extreme position to close said first main circuit and to interrupt said second branch circuit, and in the other extreme position to interrupt said first main circuit, and to close said second branch circuit, and the other of said two-way switches being connected to said second main circuit and said first branch circuit so that this switch serves in one extreme position to close said second main circuit and to interrupt said first branch circuit, and in the other extreme position to interrupt said second main circuit and to close said first branch circuit, whereby in the event of said arms getting out of step due to inequality in the relative speeds of said motors, one of said two-way switches is actuated before the other to interrupt the associated main circuit until the other two-way switch is actuated to re-establish the interrupted main circuit through the branch circuit connected thereto.

References Cited in the file of this patent

UNITED STATES PATENTS

| | | |
|---|---|---|
| 1,832,082 | Bornstein | Nov. 17, 1931 |
| 1,963,087 | Hay | June 19, 1934 |
| 2,357,152 | Whitted | Aug. 29, 1944 |
| 2,401,358 | Lazar | June 4, 1946 |
| 2,425,442 | Schall | Aug. 12, 1947 |
| 2,513,247 | Morton | June 27, 1950 |